United States Patent
Pulleti et al.

(10) Patent No.: US 10,250,821 B2
(45) Date of Patent: Apr. 2, 2019

(54) GENERATING A THREE-DIMENSIONAL MODEL OF AN INDUSTRIAL PLANT USING AN UNMANNED AERIAL VEHICLE

(71) Applicant: Honeywell International Inc., Morristown, NJ (US)

(72) Inventors: Uday K. Pulleti, Machilipatnam (IN); Patrick Gonia, Maplewood, MN (US); Arun Vijayakumari Mahasenan, Trivandrum (IN)

(73) Assignee: Honeywell International Inc., Morris Plains, NJ (US)

( * ) Notice: Subject to any disclaimer, the term of this patent is extended or adjusted under 35 U.S.C. 154(b) by 213 days.

(21) Appl. No.: 14/091,920

(22) Filed: Nov. 27, 2013

(65) Prior Publication Data

US 2015/0145954 A1 May 28, 2015

(51) Int. Cl.
*H04N 5/33* (2006.01)
*B64C 39/02* (2006.01)

(52) U.S. Cl.
CPC .............. *H04N 5/33* (2013.01); *B64C 39/02* (2013.01); *B64C 2201/02* (2013.01)

(58) Field of Classification Search
CPC ...... H04N 13/0275; H04N 5/33; B64C 39/02; B64C 2201/02
See application file for complete search history.

(56) References Cited

U.S. PATENT DOCUMENTS

| 7,706,979 | B1 * | 4/2010 | Herwitz | G01S 13/003 |
| | | | | 701/301 |
| 8,948,932 | B2 * | 2/2015 | Yeager | G05D 1/0022 |
| | | | | 701/3 |
| 9,104,201 | B1 * | 8/2015 | Pillai | B64C 39/024 |
| 9,162,753 | B1 * | 10/2015 | Panto | B64C 19/00 |
| 9,330,504 | B2 * | 5/2016 | Ege | G06T 17/05 |
| 2007/0129855 | A1 * | 6/2007 | Coulmeau | G08G 5/0039 |
| | | | | 701/3 |

(Continued)

FOREIGN PATENT DOCUMENTS

| CA | 2832956 A1 * 10/2012 | ........... B64C 39/024 |
| CA | 2832956 A1 * 10/2012 | ........... B64C 39/024 |

(Continued)

OTHER PUBLICATIONS

Baba, M., K. Ohatani, and S. Komatsu, "3D shape recognition system by ultrasonic sensor array and genetic algorithms", IMTC 2004, Instrumentation and Measure"ent Technology Conference, Como, Italy, May 18-20, 2004.*

(Continued)

*Primary Examiner* — Mohammed S Rahaman
*Assistant Examiner* — Richard A Hansell, Jr.
(74) *Attorney, Agent, or Firm* — Shumaker & Sieffert, P.A.

(57) ABSTRACT

Generating a three-dimensional model of an industrial plant using an unmanned aerial vehicle is described herein. One method includes capturing, using an unmanned aerial vehicle, a number of visual images of an industrial plant, capturing, using the unmanned aerial vehicle, a number of infrared images of the industrial plant, and forming a three-dimensional model of the industrial plant by combining the number of visual images and the number of infrared images.

20 Claims, 2 Drawing Sheets

(56) References Cited

U.S. PATENT DOCUMENTS

| | | | | |
|---|---|---|---|---|
| 2010/0010741 | A1* | 1/2010 | Tener | F41G 7/34 701/500 |
| 2010/0017114 | A1* | 1/2010 | Tehan | G01C 21/00 701/423 |
| 2010/0100269 | A1* | 4/2010 | Ekhaguere | G05D 1/101 701/26 |
| 2010/0228418 | A1* | 9/2010 | Whitlow | G11B 27/105 701/25 |
| 2010/0268409 | A1* | 10/2010 | Vian | G05D 1/104 701/24 |
| 2011/0090337 | A1* | 4/2011 | Klomp | G01C 11/025 348/144 |
| 2011/0264311 | A1* | 10/2011 | Lee | H04N 7/183 701/15 |
| 2011/0320068 | A1* | 12/2011 | Lee | G05D 1/0011 701/2 |
| 2012/0053757 | A1* | 3/2012 | Breshears | G01S 5/0081 701/2 |
| 2012/0200703 | A1* | 8/2012 | Nadir | G02B 27/644 348/144 |
| 2012/0262708 | A1* | 10/2012 | Connolly | B64C 39/024 356/237.2 |
| 2013/0216089 | A1* | 8/2013 | Chen | G06T 7/0002 382/100 |
| 2013/0231779 | A1* | 9/2013 | Purkayastha | B25J 9/1697 700/259 |
| 2013/0317667 | A1* | 11/2013 | Kruglick | B64C 39/024 701/2 |
| 2014/0032021 | A1* | 1/2014 | Metzler | G01S 5/0036 701/3 |
| 2014/0312165 | A1* | 10/2014 | Mkrtchyan | B64D 47/08 244/13 |
| 2015/0142211 | A1* | 5/2015 | Shehata | H04N 7/181 701/2 |

FOREIGN PATENT DOCUMENTS

| | | | | |
|---|---|---|---|---|
| EP | | 2520343 | A2 * 11/2012 | A63B 29/021 |
| EP | | 2520343 | A2 * 11/2012 | A63B 29/021 |
| EP | | 2575367 | 4/2013 | |
| EP | | 2575367 | A2 * 4/2013 | G01C 11/025 |
| EP | | 2575367 | A2 * 4/2013 | G01C 11/025 |
| WO | WO | 2012140191 | A1 * 10/2012 | B64C 39/024 |
| WO | WO- | 2012140191 | A1 * 10/2012 | B64C 39/024 |

OTHER PUBLICATIONS

Bachrach A., S. Prentice, R. He, P. Henry, A. Huang, M. Krainin, D. Maturana, D. Fox, and N. Roy (Estimation, planning and mapping for autonomous flight using RGB-D camera in GPS denied environments, Int. J. of Robotics Research 31(11) 1320-1343, doi:10.1177/0278364912455256, 2012).*

YouTube video titled, "Bridge Inspection using a UAV" from Angel Aerial Survey published on Sep. 8, 2013 (web-link: https://www.youtube.com/watch?v=6uyAK0std6o)—Sample frame at 1:11 seconds—YouTube_Bridge_Inspection_NPL_090813a.PDF.*

YouTube video titled, "Bridge Inspection using a UAV" from Angel Aerial Survey published on Sep. 8, 2013 (web-link: https://www.youtube.com/watch?v=6uyAK0std6o)—Sample frame at 1:34 seconds—YouTube_Bridge_Inspection_NPL_090813b.PDF.*

YouTube video titled, "Aerial Bridge Inspection" from John Kerbob published on Apr. 26, 2013 (web-link: https://www.youtube.com/watch?v=aAGAmPXo1B8)—Sample frame at 2:21 seconds—YouTube_Bridge_Inspection_NPL_042613a.PDF.*

YouTube video titled, "Aerial Bridge Inspection" from John Kerbob published on Apr. 26, 2013 (web-link: https://www.youtube.com/watch?v=aAGAmPXo1B8)—Sample frame at 2:22 seconds—YouTube_Bridge_Inspection_NPL_042613b.PDF.*

Nikolic, J., M. Burri, J. Rehder, S. Leutenegger, C. Huerzeler, and R. Siegwart, "A UAV System for Inspection of Industrial Facilities", Aerospace Conference, 2013 IEEE, Mar. 2-9, 2013, pp. 1-8, doi:10.1109/AERO.2013.6496959.*

Baba, M., K. Ohatani, and S. Komatsu, "3D shape recognition system by ultrasonic sensor array and genetic algorithms", IMTC 2004, Instrumentation and Measurement Technology Conference, Como, Italy, May 18-20, 2004 (provided in previous Office Action).*

Bachrach A., S. Prentice, R. He, P. Henry, A. Huang, M. Krainin, D. Maturana, D. Fox, and N. Roy (Estimation, planning and mapping for autonomous flight using RGB-D camera in GPS denied environments, Int. J. of Robotics Research 31(11) 1320-1343, doi:10.1177/0278364912455256, 2012) (Provided in previous Office Action).*

YouTube video titled, "Cyberhawk UAV Inspection—Shell" from Shell published on Jul. 15, 2013 (web-link: https://www.youtube.com/watch?v=71_NYF-5tnk).*

YouTube video clip titled, "Live onshore flare stack inspection for Statoil", by Sky Futures, published on Oct. 21, 2013. https://www.youtube.com/watch?v=N9WeKJZyAbY.*

YouTube video clip titled, "Silo inspection at work with AR-Drone 2.0", by Frank Sorensen, published on Aug. 24, 2013. https://www.youtube.com/watch?v=QVXPpEAOA_w.*

YouTube video clip titled, "Cyberhawk UAV Inspection—Shell", by Cyberhawkinnovations, Published on Jul. 15, 2013. See https://www.youtube.com/watch?v=71_NYF-5tnk.*

YouTube video clip titled, "Aerial drone surveillance over industrial area" by D.M. Daniel, Published on Aug. 31, 2012. See https://www.youtube.com/watch?v=Lov6d1L1DbE.*

Example image at 3:53 sec. selected from video, "Live onshore flare stack inspection for Statoil" by Sky Futures (Oct. 21, 2013).*

Example image at 2:15 sec. selected from video, "Live onshore flare stack inspection for Statoil" by Sky Futures (Oct. 21, 2013).*

Example image at 0:35 sec. selected from video, "Silo inspection at work with AR-Drone 2.0I" by Sorensen (Aug. 24, 2013).*

Example image at 0:20 sec. selected from video, "Silo inspection at work with AR-Drone 2.0I" by Sorensen (Aug. 24, 2013).*

S-S. Jan and Y-H Lin, "Integrated Flight Path Planning System and Flight Control System for Unmanned Helicopters", Sensors 2011, 11, 7502-7529, doi:10.3390/s110807502.*

Baba, M., K. Ohatani, and S. Komatsu, "3D shape recognition system by ultrasonic sensor array and genetic algorithms", IMTC 2004, Instrumentation and Measure"ent Technology Conference, Como, Italy, May 18-20, 2004 (Year: 2004).*

Bachrach A., S. Prentice, R. He, P. Henry, A. Huang, M. Krainin, D. Maturana, D. Fox, and N. Roy (Estimation, planning and mapping for autonomous flight using RGB-D camera in GPS denied environments, Int. J. of Robotics Research 31 (11) 1320-1343, doi:10.1177/0278364912455256, 2012) (Year: 2012).*

YouTube video titled, "Bridge Inspection using a UAV" from Angel Aerial Survey published on Sep. 8, 2013 (web-link:https://www.youtube.com/watch?v=6uyAK0std6o)—Sample frame at 1:11 seconds—YouTube_Bridge_Inspection_NPL_090813a.PDF (Year: 2013).*

YouTube video titled, "Bridge Inspection using a UAV" from Angel Aerial Survey published on Sep. 8, 2013 (web-link:https://www.youtube.com/watch?v=6uyAK0std6o)—Sample frame at 1:34 seconds—YouTube_Bridge_Inspection_NPL_090813b.PDF (Year: 2013).*

YouTube video titled, "Aerial Bridge Inspection" from John Kerbob published on Apr. 26, 2013 (web link: https://www.youtube.com/watch?v=aAGAnnPXo1B8)—Sample frame at 2:21 seconds—YouTube_Bridge_Inspection_NPL_042613a.PDF (Year: 2013).*

YouTube video titled, "Aerial Bridge Inspection" from John Kerbob published on Apr. 26, 2013 (web-link: https://www.youtube.com/watch?v=aAGAmPXo1B8)—Sample frame at 2:22 seconds—YouTube_Bridge_Inspection_NPL_042613b.PDF (Year: 2013).*

Nikolic, J., M. Burri, J. Rehder, S. Leutenegger, C. Huerzeler, and R. Siegwart, "A UAV System for Inspection of Industrial Facilities" , Aerospace Conference, 2013 IEEE, Mar. 2-9, 2013, pp. 1-8, doi:10.1109/AERO.2013.6496959 (Year: 2013).*

YouTube video titled, "Cyberhawk UAV Inspection—Shell" from Shell published on Jul. 15, 2013 (web-link: https://www.youtube.com/watch?v=71 NYF-5tnk) (Year: 2013).*

Example image at 3:53 sec. selected from video, "Live onshore flare stack inspection for Statoil" by Sky Futures (Oct. 21, 2013) (Year : 2013).*

(56) References Cited

OTHER PUBLICATIONS

Example image at 2:15 sec. selected from video, "Live onshore flare stack inspection for Statoil" by Sky Futures (Oct. 21, 2013 (Year: 2013).*

Example image at 0:35 sec. selected from video, "Silo inspection at work with AR-Drone 2.01" by Sorensen (Aug. 24, 2013) (Year: 2013).*

Example image at 0:20 sec. selected from video, "Silo inspection at work with AR-Drone 2.01" by Sorensen (Aug. 24, 2013) (Year: 2013).*

S-S. Jan and Y-H Lin, "Integrated Flight Path Planning System and Flight Control System for Unmanned Helicopters", Sensors 2011, 11,7502-7529, doi:10.3390/s110807502 (Year: 2011).*

Mitch Bryson, et al. "Kite Aerial Photography for Low-Cost, Ultra-high Spatial Resolution Multi-Spectral Mapping of Intertidal Landscapes", PLOS ONE, vol. 8, No. 9. Sep. 19, 2013. 15 pages.

Yahyanejad, S: "Orthorectied Mosaicking of Images from Small-scale Unmanned Aerial Vehicles", Mar. 31, 2013, http://ubdocs.uni-klu.ac.at/open/hssvo11/AC10774911.pdf. 84 pages.

EP Search Report related to EP Application 14191186.7, dated Apr. 7, 2015 (5 pages).

Next-Generation Aerial Image Processing Software. PIX4D. Sep. 25, 2013. http://www.pix4d.com. 4 pages.

Response to Communication dated Jun. 9, 2015, from counterpart European Patent Application No. EP 14191186.7, filed on Aug. 4, 2015, 11 pp.

Communication pursuant to Article 94(3) from counterpart European Patent Application No. 14191186.7, dated Jul. 16, 2018, 3 pp.

Response to Examination Report dated Jul. 16, 2018, from counterpart European Application No. 14191186.7, filed Oct. 26, 2018, 14pp.

Office Action from counterpart Australian Application No. 2014256424 dated Dec. 12, 2018, 5 pp.

\* cited by examiner

GENERATING A THREE-DIMENSIONAL MODEL OF AN INDUSTRIAL PLANT USING AN UNMANNED AERIAL VEHICLE

TECHNICAL FIELD

The present disclosure relates to generating a three-dimensional model of an industrial plant using an unmanned aerial vehicle.

BACKGROUND

A three-dimensional (3D) model (e.g., map) of an industrial plant can have great value. For example, a 3D model of an industrial plant can be used to plan (e.g., used for automated planning of) the infrastructure of the industrial plant, such as, for instance, the lighting, control systems, wireless networks, location tracking systems, fire alarm systems, hazardous material leak systems, and/or security and monitoring systems of the plant, to a high degree of efficiency and/or accuracy. Further, a 3D model of an industrial plant can aid in asset tracking and/or emergency operations (e.g., emergency rescue and/or evacuation) in the plant.

Most current models of industrial plants, however, are two-dimensional (2D). For example, most current models of industrial plants may be based on the floor plans of the plant, which only provide 2D information. Planning the infrastructure of an industrial plant using such 2D models may be less efficient and/or less accurate than using a 3D model of the plant. Further, a 2D model of an industrial plant may not be as useful in asset tracking and/or emergency operations than a 3D model of the plant.

DETAILED DESCRIPTION

Figure 1:
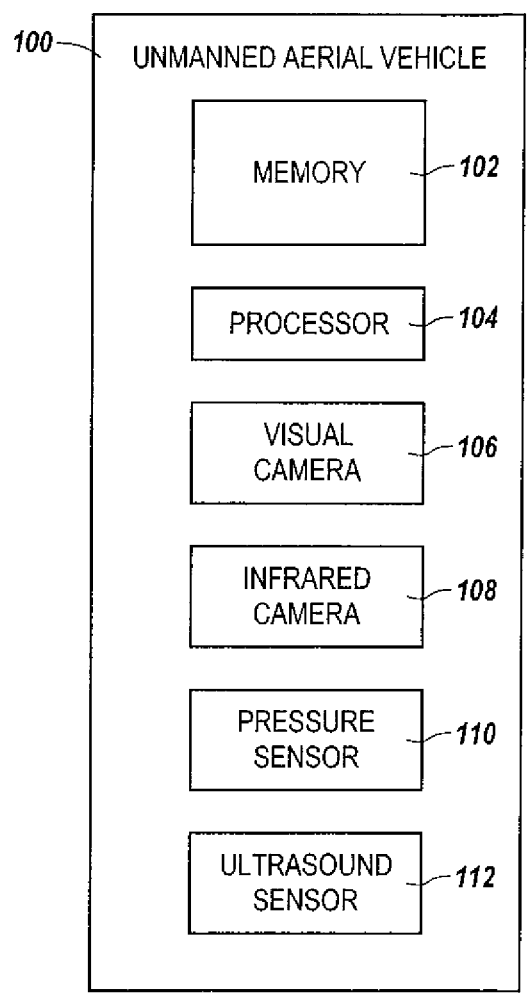
FIG. 1 illustrates a block diagram of an unmanned aerial vehicle in accordance with one or more embodiments of the present disclosure.

Generating a three-dimensional model of an industrial plant using an unmanned aerial vehicle is described herein. For example, one or more embodiments include capturing, using an unmanned aerial vehicle, a number of visual images of an industrial plant, capturing, using the unmanned aerial vehicle, a number of infrared images of the industrial plant, and forming a three-dimensional model of the industrial plant by combining the number of visual images and the number of infrared images.

Three-dimensional (3D) industrial plants have a particular need for accuracy in terms of the heights of the objects (e.g., tanks, process plants, structures, etc.) of the plant, heights and details about various levels (e.g., floors) in process areas of the plant, thicknesses and/or densities of the piping layout in process areas of the plant, and so on. Accordingly, in embodiments of the present disclosure, an unmanned aerial vehicle (UAV) may travel (e.g., fly) at different heights along the same path above an industrial plant, and capture a number of images (e.g., visual and infrared images) of the plant from a lateral (e.g., side) view (e.g., as opposed to the top view images used to generate two-dimensional models). These lateral view images taken from different directions can be used to generate accurate height and density information about the objects of the plant.

A 3D model of an industrial plant generated using a UAV in accordance with the present disclosure may be used to plan (e.g., used for automated planning of) the infrastructure of the industrial plant, such as, for instance, the lighting, control systems, wireless networks, location tracking systems, fire alarm systems, hazardous material leak systems, and/or security and monitoring systems of the plant, to a higher degree of efficiency and/or accuracy than a two-dimensional (2D) model. For example, a 3D model of an industrial plant generated using a UAV in accordance with the present disclosure may have more accurate information about the heights, densities, and/or thicknesses of objects (e.g., tanks, process plants, structures, etc.) of the plant than a 2D model. Further, a 3D model of an industrial plant generated using a UAV in accordance with the present disclosure may be more useful in asset tracking and/or emergency operations (e.g., emergency rescue and/or evacuation) in the plant than a 2D model.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 100 may reference element "00" in FIG. 1, and a similar element may be referenced by 200 in FIG. 2.

As used herein, "a" or "a number of" something can refer to one or more such things. For example, "a number of sensors" can refer to one or more sensors.

FIG. 1 illustrates a block diagram of an unmanned aerial vehicle (UAV) 100 in accordance with one or more embodiments of the present disclosure. UAV 100 can be used to generate a three-dimensional (3D) model (e.g., map) of an industrial plant (e.g., of the objects of the industrial plant), as will be further described herein.

As used herein, a UAV (e.g., UAV 100) can refer to an aircraft that does not have a human pilot on board, and whose flight is controlled autonomously by an on-board computing system and/or by a human or computer via remote control. For example, UAV 100 can be a drone.

As shown in FIG. 1, UAV 100 includes a memory 102 and a processor 104 coupled to memory 102. Memory 102 can be any type of storage medium that can be accessed by processor 104 to perform various examples of the present disclosure. For example, memory 102 can be a non-transitory computer readable medium having computer readable instructions (e.g., computer program instructions) stored thereon that are executable by processor 104 to perform various examples of the present disclosure. That is, processor 104 can execute the executable instructions stored in memory 102 to perform various examples of the present disclosure.

Memory 102 can be volatile or nonvolatile memory. Memory 102 can also be removable (e.g., portable) memory, or non-removable (e.g., internal) memory. For example, memory 102 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 102 is illustrated as being located in UAV 100, embodiments of the present disclosure are not so limited. For example, memory 102 can also be located internal to another computing resource (e.g., enabling computer readable instructions to be downloaded over the Internet or another wired or wireless connection).

UAV 100 can travel (e.g., fly) above an industrial plant. For example, in some embodiments, UAV 100 can travel along a pre-programmed route above the plant. That is, the route above the plant travelled by UAV 100 can be pre-determined and programmed into UAV 100 (e.g., stored in memory 102) before UAV 100 begins its travel above the plant. The pre-programmed route can be, for example, a straight line route, such that UAV 100 travels in a straight line(s) above the plant.

In such embodiments (e.g., embodiments in which UAV 100 travels along a pre-programmed, set of straight lines along a route), UAV 100 can travel above the industrial plant (e.g., along the route) without using (e.g., without relying on) Global Positioning System (GPS) information. For example, UAV 100 (e.g., memory 102) can store (e.g., know) the initial position of UAV 100 (e.g., the position of UAV 100 at the beginning of the pre-programmed route), and UAV 100 can then subsequently determine its relative position with respect to the initial position while travelling along the pre-programmed route. The route can be programmed as a combination of straight lines, and visual odometry can be used to determine the relative position of UAV 100 with a high degree of accuracy without using GPS information.

In some embodiments, the pre-programmed route can be determined (e.g., planned) based on a two-dimensional (2D) site map of the industrial plant. An example of a pre-programmed, straight line route along which UAV 100 can travel will be further described herein (e.g., in connection with FIG. 2).

While travelling above the industrial plant (e.g., along the pre-programmed route above the plant), UAV 100 can capture a number (e.g., plurality) of images of the plant (e.g., of the objects of the plant). That is, UAV 100 can capture a number of images of the plant from above the plant.

For example, as shown in FIG. 1, UAV 100 can include a visual camera 106 and an infrared camera 108. Visual camera 106 can capture a number (e.g., plurality) of visual images of the plant (e.g., of the objects of the plant) while UAV 100 is travelling above the industrial plant (e.g., along the pre-programmed route above the plant), and infrared camera 108 can capture a number (e.g., plurality) of infrared images of the plant (e.g., of the objects of the plant) while UAV 100 is travelling above the industrial plant (e.g., along the pre-programmed route above the plant). Visual camera 106 and infrared camera 108 can be a cluster of cameras. For example, the cluster can include one camera pointing vertically down from UAV 100, and four cameras pointing in the horizontal direction each separated by a 90 degree angle (e.g., pointing in four different directions). However, embodiments of the present disclosure are not limited to a particular camera cluster orientation.

In some embodiments, UAV 100 (e.g., visual camera 106 and infrared camera 108) can capture a number of images (e.g., a number of visual and infrared images) of the industrial plant from a number of different heights above and/or nearby the plant. For example, UAV 100 can travel along the pre-programmed route at a number of different heights above and/or nearby the plant, and capture a number of images of the plant while travelling along the pre-programmed route at each of the different heights.

Further, UAV 100 (e.g., visual camera 106 and infrared camera 108) can capture a number of lateral images (e.g., a number of lateral visual and infrared images) of the industrial plant. For example, UAV 100 can capture a number of lateral images of the objects (e.g., tanks, process plants, structures, etc.) of the plant from (e.g., while travelling along) the side(s) of the objects. That is, UAV 100 can capture a number of cross-sectional images of the objects of the plant. The lateral (e.g., cross-sectional) images of the objects can provide the depths (e.g., lateral depths) of the objects, and increase the accuracy in determining the heights of the objects. The lateral images can be captured by the horizontal cameras in the camera cluster, and horizontal images can be captured by the vertical camera in the cluster.

In some embodiments, UAV 100 (e.g., visual camera 106 and infrared camera 108) can capture a number of lateral images (e.g., a number of lateral visual and infrared images) of the objects of the industrial plant from a number of different directions around the objects. For example, UAV 100 can travel around the objects of the plant in a number of different directions, and capture a number of lateral images of the objects while travelling around the objects in each of the different directions.

As shown in FIG. 1, UAV 100 can include a pressure sensor 110 and an ultrasound sensor 112. Pressure sensor 110 and ultrasound sensor 112 can determine (e.g., measure) the dimensions (e.g., heights) of the objects of the industrial plant while UAV 100 is travelling above the plant and/or along the side(s) of the objects.

In some embodiments, UAV 100 can store (e.g., in memory 102) the number of images (e.g., the number of visual and infrared images) of the industrial plant captured by UAV 100 (e.g., by visual camera 106 and infrared camera 108) while travelling above the plant, the different heights above the plant from which UAV 100 captured the images, the number of lateral images of the plant captured by UAV 100, the time when each of the images and lateral images were captured by UAV 100, the location of UAV 100 when each of the images and lateral images were captured, the orientation of visual camera 106 and infrared camera 108 when each of the images and lateral images were captured, and the heights of the objects of the plant determined by pressure sensor 110 and ultrasound sensor 112.

The number of images (e.g., the number of visual and infrared images) of the industrial plant captured by UAV 100 (e.g., by visual camera 106 and infrared camera 108) while travelling above the plant, and the number of lateral images of the plant captured by UAV 100, can be combined to form a three-dimensional (3D) model of the plant. For example, UAV 100 can (e.g., after UAV 100 has landed) transmit (e.g., send) the number of images, the number of lateral images, the different heights above the plant from which UAV 100 captured the images, the time when each of the images and lateral images were captured by UAV 100, the location of UAV 100 when each of the images and lateral images were captured, the orientation of visual camera 106 and infrared camera 108 when each of the images and lateral images were captured, and the heights of the objects of the plant determined by pressure sensor 110 and ultrasound sensor 112, to an additional computing device (e.g., via a direct communication link such as a radio link, a wired or wireless network, or a removable memory), and the additional computing device can form the 3D model of the plant by combining the number of images and the number of lateral images, along with the other information received from UAV 100. The additional computing device can be, for example, a laptop computer, a desktop computer, or a mobile device (e.g., a mobile phone, a smart phone, a personal digital assistant, etc.), among other types of computing devices, and can be located remotely from UAV 100.

Figure 2:
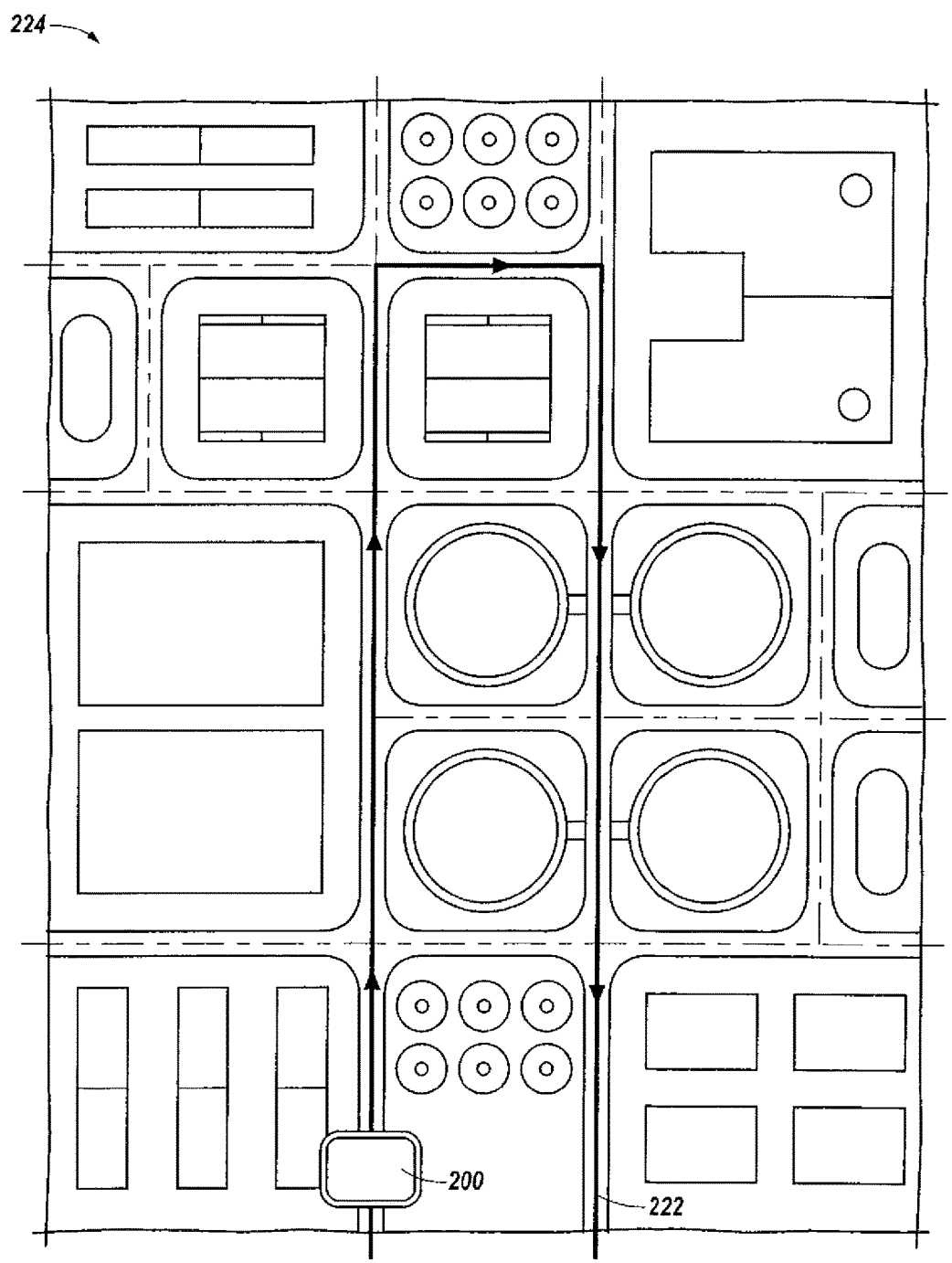
FIG. 2 illustrates a route above an industrial plant along which an unmanned aerial vehicle can travel in accordance with one or more embodiments of the present disclosure.

FIG. 2 illustrates a route 222 above an industrial plant (e.g., industrial plant 224) along which an unmanned aerial vehicle (e.g., unmanned aerial vehicle 200) can travel (e.g., fly) in accordance with one or more embodiments of the present disclosure. Unmanned aerial vehicle (UAV) 200 can be, for example, UAV 100 previously described in connection with FIG. 1. UAV 200 can travel along route 222 above plant 224 a single (e.g., one) time, or multiple (e.g., more than one) times in a particular flight.

Route 222 can be a pre-programmed route, as previously described herein (e.g., in connection with FIG. 1). Further, route 222 can be programmed to be travelled by UAV 200 at different heights above the plant. For example, UAV can travel along route 222 at a height of two meters above the plant, then travel along route 222 at a height of four meters above the plant, then travel along route 222 at a height of six meters above the plant, and so on, until a pre-defined height is reached. However, embodiments of the present disclosure are not limited to particular heights, or to a particular number of different heights.

In the example illustrated in FIG. 2, route 222 is a straight line route, such that UAV 200 travels in straight lines in different directions (e.g., three different straight lines in three different directions) above industrial plant 224. However, embodiments of the present disclosure are not limited to the particular route (e.g., the particular straight line route) illustrated in FIG. 2. Further, although not illustrated in FIG. 2, in some embodiments UAV 200 can travel along a number of additional (e.g., different) routes above plant 224. The additional routes may and/or may not overlap (e.g., partially overlap) and/or intersect with (e.g., cross) route 222.

In the example illustrated in FIG. 2, route 222 can begin and end at different positions (e.g., locations) above industrial plant 224. That is, the initial position of UAV 200 (e.g., the position of UAV 200 at the beginning of route 222) can be different than the final position of UAV 200 (e.g., the position of UAV 200 at the end of route 222). However, embodiments of the present disclosure are not so limited. For example, in some embodiments, the route can begin and end at the same position above industrial plant 224. That is, the initial and final positions of UAV 200 can be the same.

Because route 222 can be a pre-programmed, straight line route, UAV 200 can travel along route 222 without using Global Positioning System (GPS) information, as previously described herein (e.g., in connection with FIG. 1). For example, UAV 200 can use the vertical camera and visual odometry to determine its velocity and the relative distance it has travelled. UAV 200 can also determine the angle it has to turn at the end of the straight line of the route using the images of the vertical camera, for example, 90 degrees in route 222 at the end of the first line. Further, in some embodiments, route 222 can be determined based on a 2D site map of industrial plant 224, as previously described herein (e.g., in connection with FIG. 1). The image patterns in the 2D map can be used for determining the relative position of UAV 200.

While travelling along route 222 above industrial plant 224, UAV 200 can capture a number of images of plant 224, as previously described herein (e.g., in connection with FIG. 1). For example, as shown in FIG. 2, plant 224 can include a number of objects, such as, for instance, a number of tanks (e.g., circular tanks), process plants, and other structures, and UAV 200 can capture a number of images of the objects of plant 224 while travelling along route 222, as previously described herein (e.g., in connection with FIG. 1). Further, UAV 200 can determine the heights of the objects of plant 224 while travelling above plant 224, as previously described herein (e.g., in connection with FIG. 1).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method of generating a three-dimensional model of a site, the method comprising:

capturing, using a single unmanned aerial vehicle, a number of visual images of the site;

capturing, using the single unmanned aerial vehicle, a number of infrared images of the site, wherein the number of visual images and the number of infrared images captured using the single unmanned aerial vehicle include a number of lateral images of all objects of the site captured by the single unmanned aerial vehicle while travelling along a route between a plurality of the objects of the site, including between tanks of the site, at different heights of the site;

determining a relative position of the single unmanned aerial vehicle while the single unmanned aerial vehicle is travelling along the route between the plurality of objects of the site, wherein the relative position of the single unmanned aerial vehicle is determined using the captured visual and infrared images and a known initial position of the single unmanned aerial vehicle at a beginning of the route stored in the single unmanned aerial vehicle;

determining dimensions, including heights, of the plurality of the objects of the site based on the number of lateral images and based on data from a pressure sensor or an ultrasound sensor; and forming a three-dimensional model of the site based on the dimensions of the plurality of the objects of the site and based on the relative position of the single unmanned aerial vehicle while the single unmanned aerial vehicle is travelling along the pre-programmed route by combining the number of visual images and the number of infrared images.

2. The method of claim 1, wherein the number of visual images and the number of infrared images include a number of images captured from a number of different heights above the site.

3. The method of claim 1, further comprising storing, by the single unmanned aerial vehicle, the number of visual images, the number of infrared images, time when each of the number of visual images and number of infrared images are captured, an orientation of a camera on the single unmanned aerial vehicle when each image of the number of lateral images was captured, and location of the single unmanned aerial vehicle when each of the number of visual images and number of infrared images are captured, wherein forming the three-dimensional model of the site is further based on the time when each of the number of visual images and number of infrared images are captured, the orientation of the camera when each image of the number of lateral images is captured, and location of the single unmanned aerial vehicle when each of the number of visual images and number of infrared images are captured.

4. The method of claim 1, further comprising transmitting, by the single unmanned aerial vehicle, the number of visual images, the number of infrared images, time when each of the number of visual images and number of infrared images are captured, and location of the single unmanned aerial vehicle when each of the number of visual images and number of infrared images are captured, to a computing device.

5. A method of generating a three-dimensional model of an industrial plant, the method comprising:

capturing, using a single unmanned aerial vehicle, a number of images of an industrial plant by travelling the single unmanned aerial vehicle along different routes and capturing images at different heights along the routes, wherein the number of images captured using the single unmanned aerial vehicle include a number of lateral images of all objects of the industrial plant captured by the single unmanned aerial vehicle while travelling between a plurality of the objects of the industrial plant, including between process plants of the industrial plant, at different heights of the industrial plant;

determining a relative position of the single unmanned aerial vehicle while the single unmanned aerial vehicle is travelling along the different routes between the plurality of objects of the industrial plant, wherein the relative position of the single unmanned aerial vehicle is determined using the captured images and a known initial position of the single unmanned aerial vehicle at a beginning of each of the different routes stored in the single unmanned aerial vehicle;

determining dimensions, including heights, of the plurality of the objects of the industrial plant based on the number of lateral images and based on data from a pressure sensor or an ultrasound sensor; and forming a three-dimensional model of the industrial plant based on the dimensions of the plurality of the objects of the industrial plant and based on the relative position of the single unmanned aerial vehicle while the single unmanned aerial vehicle is travelling along the pre-programmed route by combining the number of images.

6. The method of claim 5, further comprising capturing the number of lateral images from a number of different directions, wherein forming the three-dimensional model of the industrial plant is further based on a time when each of the number of images are captured, the number of different directions, and an orientation of a camera when each image of the number of images was captured.

7. The method of claim 5, wherein the number of lateral images provide lateral depths of the objects of the industrial plant.

8. The method of claim 5, wherein the number of images include a number of visual images.

9. The method of claim 5, wherein the number of images include a number of infrared images.

10. A single unmanned aerial vehicle for generating a three-dimensional model of a site, the single unmanned aerial vehicle comprising:

a memory;

a pressure sensor or an ultrasound sensor configured to determine dimensions of objects of the site; and a processor configured to execute executable instructions stored in the memory to cause the single unmanned aerial vehicle to:

travel along a pre-programmed route above the site;

capture a number of images of the site while travelling along the pre-programmed route, wherein the number of images captured using the single unmanned aerial vehicle include a number of lateral images of all objects of the site captured by the single unmanned aerial vehicle while travelling between a plurality of objects of the site, including between tanks and process plants of the site, at different heights of the site;

determine a relative position of the single unmanned aerial vehicle while the single unmanned aerial vehicle is travelling along the pre-programmed route, wherein the relative position of the single unmanned aerial vehicle is determined using the captured images and a known initial position of the single unmanned aerial vehicle at a beginning of the pre-programmed route stored in the memory of the single unmanned aerial vehicle;

determine dimensions, including heights, of the plurality of the objects of the site based on the number of lateral images and based on data from the pressure sensor or the ultrasound sensor; and store the number of images, the dimensions of the plurality of the objects of the site and the relative position of the single unmanned aerial vehicle while the single unmanned aerial vehicle is travelling along the pre-programmed route.

11. The single unmanned aerial vehicle of claim 10, wherein the processor is configured to execute the executable instructions to store the number of images by transmitting the number of images to a remote location.

12. The single unmanned aerial vehicle of claim 10, wherein the pre-programmed route and the number of images are stored in the memory.

13. The single unmanned aerial vehicle of claim 10, further comprising:
- a visual camera configured to capture a number of visual images of the site while the single unmanned aerial vehicle is travelling along the pre-programmed route; and
- an infrared camera configured to capture a number of infrared images of the site while the single unmanned aerial vehicle is travelling along the pre-programmed route;
- wherein the visual camera and the infrared camera are a cluster of cameras pointing in different directions, wherein the different directions include a vertical direction and a number of different horizontal directions.

14. The single unmanned aerial vehicle of claim 10, wherein the processor is configured to execute the instructions to cause the single unmanned aerial vehicle to travel along the pre-programmed route at a number of different heights nearby the site.

15. The single unmanned aerial vehicle of claim 10, wherein the pre-programmed route is based on a two-dimensional site map of the site.

16. The single unmanned aerial vehicle of claim 10, wherein the processor is configured to execute the instructions to cause the single unmanned aerial vehicle to travel along the pre-programmed route without using Global Positioning System (GPS) information and using visual odometry to determine the relative position of the single unmanned aerial vehicle along a straight line path.

17. The method of claim 1, wherein determining the relative position comprises determining the relative position of the single unmanned aerial vehicle, using visual odometry, without using Global Positioning System (GPS) information.

18. The method of claim 5, wherein determining the relative position comprises determining the relative position of the single unmanned aerial vehicle, using visual odometry, without using Global Positioning System (GPS) information.

19. The single unmanned aerial vehicle of claim 10, wherein the processor is configured to execute the instructions to determine the relative position of the single unmanned aerial vehicle, using visual odometry, without using Global Positioning System (GPS) information.

20. The method of claim 1, further comprising determining density information for the plurality of the objects of the site based on the number of lateral images,
- wherein forming the three-dimensional model of the site is further based on the density information for the plurality of the objects of the site.

* * * * *